United States Patent
Rapp

(10) Patent No.: US 6,415,473 B1
(45) Date of Patent: Jul. 9, 2002

(54) WINDSHIELD WIPER

(75) Inventor: Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,121

(22) PCT Filed: Jul. 1, 1998

(86) PCT No.: PCT/DE98/01803
§ 371 (c)(1),
(2), (4) Date: Jun. 1, 1999

(87) PCT Pub. No.: WO99/05009
PCT Pub. Date: Feb. 4, 1999

(30) Foreign Application Priority Data

Jul. 23, 1997 (DE) .......................... 197 31 683

(51) Int. Cl.⁷ ............... B60S 1/32; B60S 1/40
(52) U.S. Cl. .................. 15/250.351; 15/250.32
(58) Field of Search .............. 15/250.351, 250.23, 15/250.32, 250.352, 250.43, 250.44, 250.31, 250.38, 250.33

(56) References Cited

U.S. PATENT DOCUMENTS 3,123,849 A * 3/1964 O'shei
3,832,751 A * 9/1974 Ursel et al. ............ 15/250.23
4,214,344 A * 7/1980 Kohler et al.
5,729,861 A * 3/1998 Journee ............ 15/250.351

FOREIGN PATENT DOCUMENTS

| DE | 2352536 | * | 4/1975 | ........... 15/250.351 |
| DE | 37 44 237 A1 | | 7/1989 | |
| DE | 38 29 343 | | 3/1990 | |
| DE | 44 06 131 A1 | | 9/1995 | |
| DE | 196 05 428 A1 | | 8/1997 | |
| GB | 2240264 | * | 7/1991 | ........... 15/250.351 |
| IT | 435099 | * | 5/1948 | ............ 15/250.23 |
| JP | 6-247262 | * | 9/1994 | ........... 15/250.351 |

* cited by examiner

Primary Examiner—Gary K. Graham
(74) Attorney, Agent, or Firm—Michael J. Striker

(57) ABSTRACT

A windshield wiper has a wiper arm, a wiper blade connected to the wiper arm pivotably about a transverse axis, a device secured to the wiper arm and laterally guiding the wiper blade with a spacing from the transverse axis, the device having a first guide element and also a second guide element which laterally guides the first guide element enabling a spacing between the first guide element and the wiper arm perpendicular to a windshield to vary independently of the wiper arm, the first guiding element connecting the device so that the first guiding element is guided rigidly relative to a direction of motion of the windshield wiper.

6 Claims, 3 Drawing Sheets

WINDSHIELD WIPER

BACKGROUND OF THE INVENTION

The invention is based on a windshield wiper.

Known windshield wipers have a wiper arm, which is made up of a fastening element and a link element that is pivotably connected to it and that has a wiper rod, and a wiper blade, which is made up of a support bracket system with a main bracket, intermediate brackets, claw brackets, and a wiper strip. The wiper blade is pivotably connected to the wiper arm, in that a hooklike end of the wiper rod fits between two side cheeks of the main bracket and grasps a pivot bolt. The joint thus formed guides the wiper blade during the pivoting motion over the windshield, and the joint and the support bracket system make it possible for the wiper strip to adapt to the curvature of a windshield.

If the windshield is wet or damp and the sliding speed is high enough, the wiper strip slides without jerking over the windshield, such as curved motor vehicle windshields, and produces a clean, clear viewing area If the windshields are dirty, icy, or not damp enough, or if there is snow on the windshield, then the wiper blade begins to jitter as soon as the sliding speed drops below a critical point. Since the wiper blade then briefly loses its contact with the windshield, the wiping pattern is unsatisfactory. The wiper blade tends all the more to jittering, the longer its length and the more bracket parts it has. Furthermore, light wiper blades with low spring rigidity perform unfavorably.

Since the sliding speed of the wiper strip increases linearly from the inner end near its drive mechanism toward the outer end, the risk of jittering is especially high on the inner end at low angular speeds of the windshield wiper, since the coefficient of friction rises sharply as the speed drops.

From German Patent Disclosure DE 37 44 237 A1, a windshield, wiper is known which, between the wiper arm and a claw bracket, has a device for guiding the wiper blade. This device is secured to the wiper arm and with at least one guide cheek it guides the wiper blade in the region of an articulation point of a claw bracket on the side toward the drive mechanism. The cheeks have to be long enough to guide the wiper blade securely in all its positions. Depending on the curvature of the windshield and on the kinematics of the windshield wiper, there is the risk that long cheeks, in some positions, will collide with the windshield. Finding a compromise is difficult if the windshield wipers are supposed to be suitable for various windshields of quite different curvatures.

SUMMARY OF THE INVENTION

According to the invention, the first guide element of a device is laterally guided by a second guide element of the device in such a way that the spacing from the first guide element to the wiper arm toward the windshield can vary. Since part of the spacing change between the windshield and the wiper arm can be compensated for by the second guide element, the guide cheeks of the first guide element can be kept short, so there is no need to fear a collision with the windshield even if the windshield wiper is used for windshields of quite different curvatures.

The second guide element can be equipped, similarly the first guide element, with at least one guide cheek, which cooperates with the first guide element and allows a telescopelike displacement. The second guide element may, however, also expediently be embodied by a spring tongue, which acts as a steering arm. It laterally guides the first guide element very directly and resiliently connects it, perpendicular to the windshield, to the device. The spring tongue and the guide cheeks can also be employed in combination.

Further advantages will become apparent from the ensuing description of the drawing.

In the drawing, exemplary embodiments of the invention are shown. The description and the claims include numerous characteristics in conjunction with one another. One skilled in the art will expediently also consider the characteristics individually and combine them into further appropriate combinations.

DESCRIPTION OF THE PREFERRED EMBODIMENTS

Figure 1:
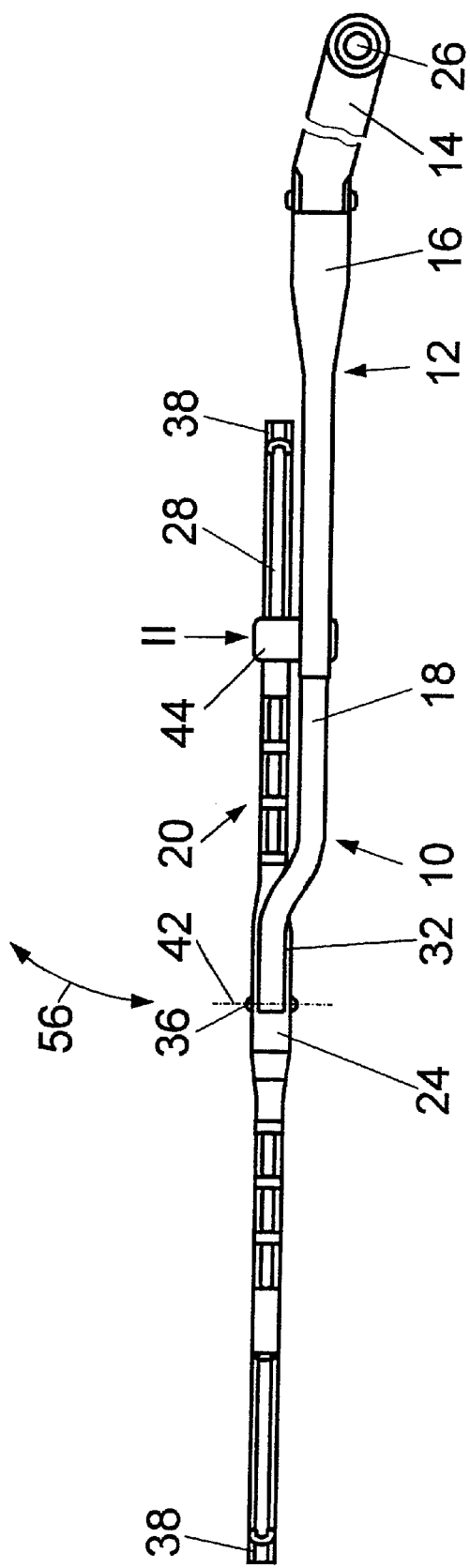
FIG. 1, an elevation view of a windshield wiper of the invention in the direction of a windshield.

The windshield wiper 10 shown has a wiper arm 12, which is secured by a fastening element 14 to a driveshaft 26. A link element 16 is pivotably connected to the fastening element together with a rod 18, which can also be embodied integrally with the link element 16 and which belongs to the wiper arm 12. The windshield wiper 10 also has a wiper blade 20, which has a support bracket system 22 with a main bracket 24 and claw brackets 28. These claw brackets are pivotably connected to the main bracket 24 via rivet bolts 34. In the case of long wiper blades 20, it is expedient to insert intermediate brackets between the main bracket 24 and the claw brackets 38 and to connect the intermediate brackets pivotably to the main bracket and claw brackets.

The claw brackets 28, with their retaining claws 30, dig into the profile of a wiper strip 38 and thus grasp spring rails 40 inserted laterally in the profile. Instead of two laterally inserted spring rails 40, a spring rail, not shown, that is guided centrally through the profile of the wiper strip 38 can also be used.

The wiper blade 20 is pivotably connected to the wiper arm 12, in that a hooklike end of the wiper rod 18 reaches between two side cheeks 32 of the main bracket 24 and grasps a pivot bolt 36. The joint thus formed allows a pivoting motion by the wiper blade 20 about a transverse axis 42 and laterally guides the wiper blade 20 in the direction of motion 56 of the windshield wiper 10 over a windshield 50.

On the wiper arm 12, and in the exemplary embodiment shown specifically on the link element 16, a device 44 for laterally guiding the wiper blade 20 is provided, in the region of the terminal claw bracket 28 pointing toward the driveshaft 26. This device is disposed in the region of the articulation point of the claw bracket 28 and is firmly connected to either the link element 16 or rod 18, for instance by adhesive bonding, welding, soldering, clipping, clamping, etc. The type of fastening depends essentially on the design of the wiper arm 12 in this region.

The device 44 has a first guide element 46, which with two guide cheeks 52 grasps the hinging point, in particular the rivet bolt 34, of the claw bracket 28 and guides it with respect to the wiper arm 12. This lessens the risk of jittering on the drive mechanism side of the wiper strip 38 at low sliding speeds, so that the windshield wiper 10 can be operated at lower medium wiper speeds.

The first guide element 46 is guided by a second guide element 48 of the device 44, so that the guide cheeks 52 of the first guide element 46 can be kept short, and there is no need to fear that the guide cheeks 52 will collide with the windshield 50, even if the windshield 50 has major curvatures.

In the present exemplary embodiment, for example, the second guide element 48 also has guide cheeks 54, between which the first guide element 46 is guided; the latter is expediently connected to the device 44 in captive fashion, for instance by a resilient element 58.

Figure 4:
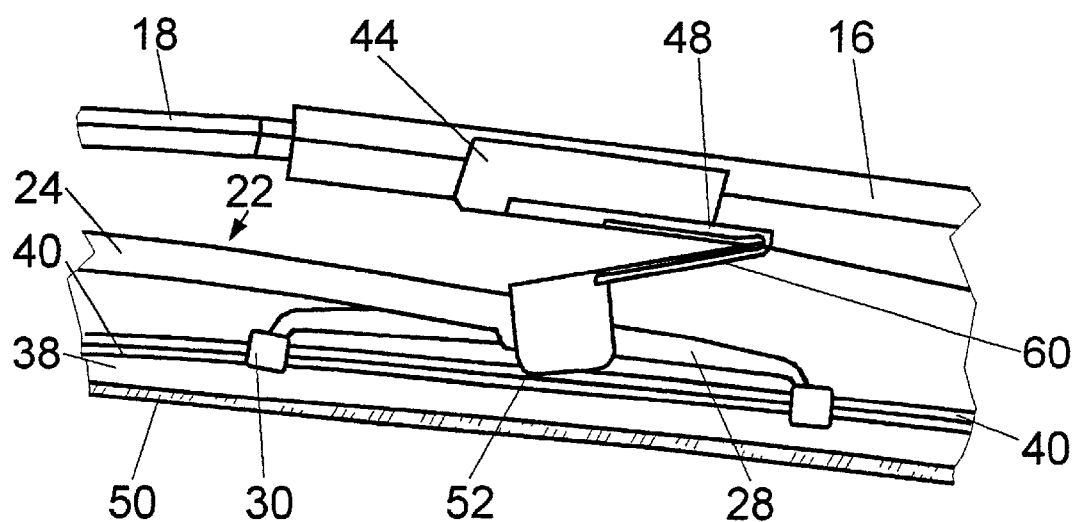
FIG. 4, a second exemplary embodiment in a view corresponding to FIG. 2.

The second guide element 48 can also comprise a spring tongue 60, as shown in FIG. 4, which connects the first guide element 46 to the device 44 in such a way that in the direction of motion 56 of the windshield wiper 10, the first guide element 46 is rigidly guided, while perpendicular to the windshield 50, it is capable of yielding relative to the wiper arm 12. Naturally, it is also possible to select a combination between a spring tongue and guide cheeks 54 (FIG. 2) as the second guide element 48; then the spring tongue takes over the function of the resilient element 58. In that case, the spring tongue 60 can be weaker by design, since the lateral forces engendered by the wiping motion are absorbed by the guide cheeks 54.

The device 44 may be made from individual sheet-metal parts and then put together, but it is preferably a plastic injection-molded part made from some suitable plastic.

Figure 2:
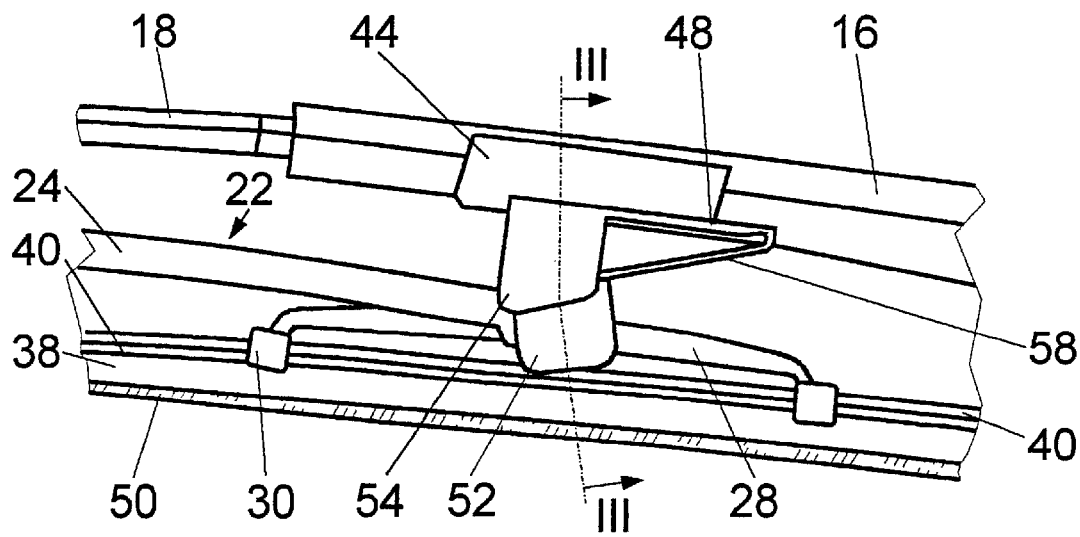
FIG. 2, a side view in the direction of an arrow 11 in FIG. 1.
Figure 3:
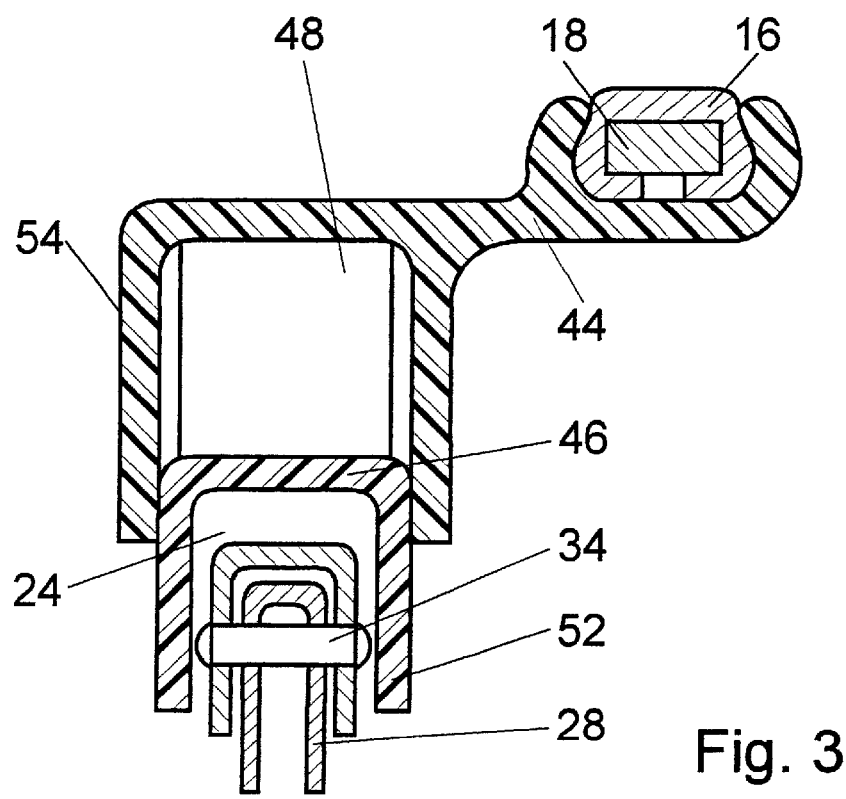
FIG. 3, an enlarge cross section taken along a line Ill-Ill in FIG. 2.

FIGS. 1 and 2 show a windshield wiper 10 in which a wiper rod 18 has a double bend, so that part of the wiper blade 20 extends parallel to the link element 16 or to the wiper rod 18. However, the invention can also be used in the same way with windshield wipers 10 in which the wiper blade 20 extends in the direction of a wiper rod 18 without a double bend, so that the wiper blade 20, with its end toward the drive mechanism, extends essentially underneath the wiper arm 12 or laterally beside it, when the wiper blade is pivotably connected to the wiper arm by the so-called side-lock technique.

What is claimed is:

1. A windshield wiper, comprising a wiper arm; a wiper blade connected to said wiper arm pivotably about a transverse axis; a device secured to said wiper arm and laterally guiding said wiper blade with a spacing from said transverse axis and preventing a rotation of said wiper blade in a plane parallel to a windshield, said device having a first guide element and also a second guide element which laterally guides said first guide element enabling a spacing between said first guide element and said wiper arm perpendicular to the windshield to vary independently of said wiper arm, said first guide element being guided rigidly relative to a direction of motion of the windshield wiper, wherein said second guide element being a spring tongue which is firmly connected by one end to said first guide element and by another end is secured to said wiper arm.

2. A windshield wiper as defined in claim 1, wherein said second guide element has at least one guide cheek cooperating with said first guide element.

3. A windshield wiper as defined in claim 1, wherein said device is a plastic injection-molded part.

4. A windshield wiper as defined in claim 1, and further comprising a wiper rod on which said device is retained.

5. A windshield wiper as defined in claim 1, and further comprising a link element on which said device is retained.

6. A windshield wiper, comprising a wiper arm; a wiper blade connected to said wiper arm pivotably about a transverse axis; a device secured to said wiper arm and laterally guiding said wiper blade with a spacing from said transverse axis and preventing a rotation of said wiper blade in a plane parallel to a windshield, said device having a first guide element and also a second guide element which laterally guides said first guide element enabling a spacing between said first guide element and said wiper arm perpendicular to the windshield to vary independently of said wiper arm, said first guide element being guided rigidly relative to a direction of motion of the windshield wiper, said first guide element being U-shaped.

* * * * *